(12) United States Patent
Huitema

(10) Patent No.: US 7,245,622 B2
(45) Date of Patent: Jul. 17, 2007

(54) ALLOWING IPV4 CLIENTS TO COMMUNICATE OVER AN IPV6 NETWORK WHEN BEHIND A NETWORK ADDRESS TRANSLATOR WITH REDUCED SERVER WORKLOAD

(75) Inventor: Christian Huitema, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 10/401,083

(22) Filed: Mar. 27, 2003

(65) Prior Publication Data

US 2004/0190549 A1    Sep. 30, 2004

(51) Int. Cl.
H04L 12/56    (2006.01)
H04L 12/28    (2006.01)
(52) U.S. Cl. .................................. 370/392; 370/401
(58) Field of Classification Search .................. 370/389, 370/392, 401, 402, 403, 404
See application file for complete search history.

(56) References Cited

U.S. PATENT DOCUMENTS

| 6,118,784 A * | 9/2000 | Tsuchiya et al. ............ 370/401 |
| 6,690,669 B1 * | 2/2004 | Tsuchiya et al. ............ 370/392 |
| 7,031,328 B2 * | 4/2006 | Thubert et al. ............. 370/401 |
| 7,116,681 B1 * | 10/2006 | Hovell et al. ............... 370/466 |
| 2002/0021703 A1 * | 2/2002 | Tsuchiya et al. ............ 370/401 |

OTHER PUBLICATIONS

Keith Moore, "Running IPv6 over a (potentially-NATted) IPv4 Network", Network Working Group, Internet Draft, Feb. 2001, also can be located at: http://www.huitema.net/papers/teredo/draft-moore-6overnat-00.txt (copy of PDF enclosed entitled Document 1, 20 pages).

Dan Kegel, NAT and Peer-to-Peer networking, caltech.edu, Jul. 17, 1999, also can be located at http://alumnus.caltech.edu/~dank/peer-nat.html, (copy of PDF enclosed entitled Document 2, 4 pages).

M. Holdredge, P. Srisuresh, Protocol Complications with the IP Network Address Translator, Network Working Group, RFC 3027, Jan. 2001, also can be located at http://ietf.org/rfc/rfc3027.txt (copy enclosed entitled Document 3, 19 pages).

(Continued)

*Primary Examiner*—Chau Nguyen
*Assistant Examiner*—Marcus Smith
(74) *Attorney, Agent, or Firm*—Workman Nydegger

(57) ABSTRACT

Mechanisms that allow IPv4 and IPv6 clients to communicate with reduced server workload. The IPv4 client initiates communication by routing an IPv4 message to a server. The server sends a similar IPv6 message to the IPv6 client. A relay intercepts the IPv6 response, generates an IPv4 response, and forwards that IPv4 response to the IPv4 client if the NAT is a cone NAT. Otherwise, the relay sends the IPv4 response to the server. The server includes the IPv4 address of the relay in the response and sends the response to the IPv4 client. The IPv4 client then communicates with the IPv6 client using the relay. The IPv6 client may also initiate communication with the IPv4 client by sending an IPv6 message to the relay where it is queued.

12 Claims, 7 Drawing Sheets

OTHER PUBLICATIONS

J. Rosenberg, J. Weinberger, C. Huitema, R. Mahy, Stun—Simple Traversal of UDP Through Network Address, Internet Engineering Task Force, Internet Draft, Aug. 22, 2002, also can be located at: http://tools.ietf.org/html/draft-ietf-midcom-stun-02 (copy of PDF enclosed entitled Document 4, 42 pages).

C. Huitema, Toredo: Tunneling IPv6 over UDP through NATs, Internet Draft, Jun. 24, 2002 (the February date in the document is incorrect), also can be located at: http://www.huitema.net/papers/teredo/draft-ietf-ngtrans-shipworm-04.txt (copy of the document entitled Document 5, 41 pages).

Teredo: Tunneling IPV6 Over UDP Through NATS-Expires Feb. 13, 2003 C. Huitma, Microsoft Aug. 13, 2002 p. 1 to 51.

Teredo: Tenneling IPV6 Over UDP Through NATS-Expires Aug. 19, 2002 C. Huitma, Microsoft Feb. 19, 2002 p. 1 to 55.

"Protocol Complications With the IP Network Address Translator"; M. Holdrege, ipVerse, P. Srisuresh, Jasmine Networks, Jan. 2001 Network Working Group Request for Comments: 3027 Category: Informational RFC3027, Jan. 2001; p. 1 to 19.

"NAT and Peer-To-Peer Networking"; Copyright 1999 Dan Kegel p. 1 to 4.

Teredo: Tunneling IPV6 Over UDP Through NATS C. Huitma; Microsoft Sep. 17, 2002 p. 1 to 52.

\* cited by examiner

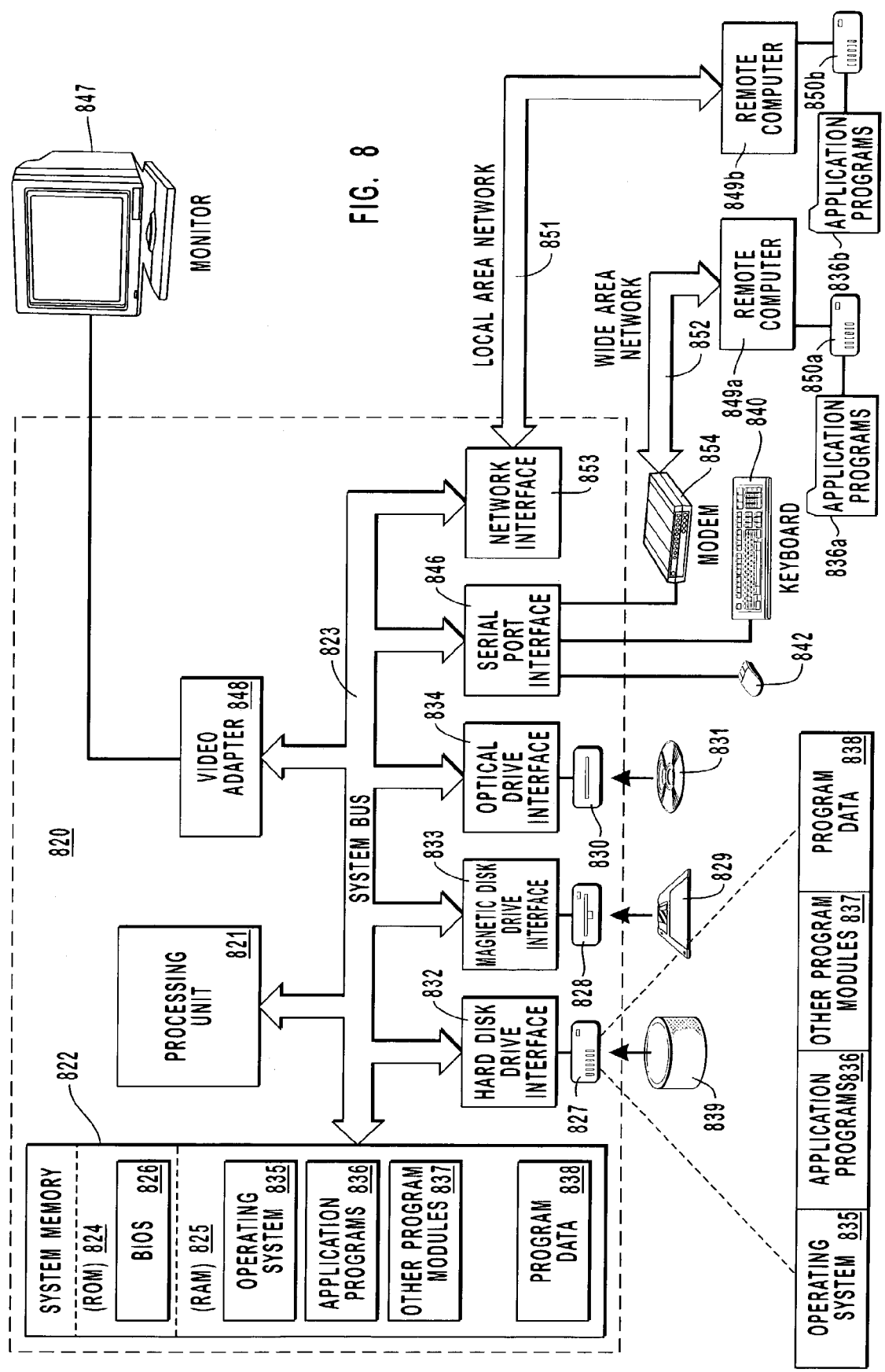

ALLOWING IPV4 CLIENTS TO COMMUNICATE OVER AN IPV6 NETWORK WHEN BEHIND A NETWORK ADDRESS TRANSLATOR WITH REDUCED SERVER WORKLOAD

BACKGROUND OF THE INVENTION

1. The Field of the Invention

The present invention relates to network communication technologies and, more specifically, to mechanisms that allow IPv4 client to communicate over an IPv6 network with reduced server workload.

2. Background and Related Art

Computer networks allow computers and potentially any associated users to communicate electronically throughout the globe over a worldwide amalgamation of networks often referred to as "the Internet". A common network protocol used to communicate over the Internet is called the Internet Protocol or "IP" for short. There are a number of different versions of the IP protocol including the common IP version 4 (herein also referred to as "IPv4") and the more recent IP version 6 (herein also referred to as "IPv6").

In order for one computing system to communicate with another computing system over a particular network, it is important that each computing system be uniquely identified on that network. IPv4 provides a 32 bit addressing mechanism, which should allow for $2^{32}$ or approximately 4 billion different addresses. Practical considerations limit the number of IPv4 addresses to approximately 2 or 3 billion. While this may seem like an unlimited supply of addresses, the proliferation of the Internet and network devices throughout the globe have pushed or exceeded these address limits.

As IPv4 addresses have become scarcer, systems called "Network Address Translators" or "NATs" have been developed. A NAT separates out a number of computing systems in a private network from the rest of the Internet. All computing systems on the Internet that are not in such a private network are required to have a unique IP address that is unique as compared to all other Internet-connected computing systems that are also not behind a NAT. However, all of the computing systems in the private network have an address that is unique to that private network, but not necessarily to the global Internet. The NAT then translates that private address into a globally unique IP address on the fly as each packet exits the private network through the NAT and into the global Internet.

Accordingly, the NAT uses a limited number (potentially even one) globally unique address that it exposes to the Internet, while allowing the network devices that are behind the NAT to have a larger number of private network addresses that need not be globally unique throughout the Internet. The use of NATs therefore allows for a short term solution to the problem of there being a relatively limited number of IPv4 addresses available. Accordingly, IPv4 computing systems and NATs often work together.

IPv6, on the other hand, has a 128 bit addressing mechanism, which is sufficient to provide unique addresses for well into the anticipated future. Accordingly, the problem associated with a limited number of unique addresses under IPv4 may be addressed by reconfiguring the Internet to operate exclusively under IPv6 instead. Such a reconfiguration is not practical for the time being as there are significant investments in the Internet that are based on the IPv4 protocol. Furthermore, the Internet is not in the control of any one entity. Getting everyone to agree to reconfigure at some expense to exclusive IPv6 would be difficult, if not impossible, to arrange as anything but a long terminal solution. Accordingly, it is commonly accepted that the Internet needs to concurrently work with both IPv6 and IPv4, at least for the near future. In order to facilitate robust communication over the Internet, mechanisms have been developed that allow for IPv4 computing systems to communicate with IPv6 computing systems.

One mechanism often referred to as the "6to4" mechanism uses IPv6 packets as payload of IPv4 packets. When transitioning from an IPv4 network to an IPv6 network, the IPv6 packet is extracted and transmitted. When transitioning from an IPv6 network to an IPv4 network, the IPv6 packet is including as the payload of an IPv4 packet, and then the IPv4 packet is transmitted. Several problems exist with this 6to4 mechanism. Specifically, it does not work well when the IPv4 computing system that is to communicate is behind a NAT. NATs are typically not programmed to allow the transmission of arbitrary payload types. Accordingly, NATs may not permit communication of a payload in the form of an IPv6 packet. Even when the NAT permits such communication, the local address within the private network cannot be used in a 6to4 scheme. The 6to4 mechanism will work with a NAT if the NAT and 6to4 router are in the same physical box. However, there are many cases in which the NAT may not be easily upgradeable to include a 6to4 routing function.

In addition, in peer-to-peer communications that occur, for example, in the video game industry, it may be that each peer (e.g., a first and second peer) is located behind a different NAT (e.g., a first and second peer, respectively). Since the private network address that each peer has need not be globally unique, it is possible that the first peer may have the same private address as a computing system behind the second NAT. Accordingly, any communication from the second peer to the first peer would be kicked back to the computing system that has the same address as the first NAT, but that is behind the second NAT. Accordingly, communication is frustrated.

One conventional way to solve this latter problem is to have each peer use a specific port in uniquely identifying each of the peers. In order for a first peer to first communicate with the second peer, the first peers constructs a message and uses its IP address as the source IP address, and then assigns a source port. The message is then sent to a third party server on the Internet. The source IP address and port are translated by the first NAT while the message is outbound to the server. The first NAT maintains the original mapping between the private IP address and port and the public IP address and port. The server also acquires knowledge of the IP address and port that may be used to communicate with the peer. The second peer does the same thing. Accordingly, both peers may learn how to communicate directly with the other peer, and then direct User Datagram Protocol-based communication may occur. However, this technology does not always works when a NAT is configured to not send messages to a peer that it has no previous knowledge of.

Accordingly, what are desired are mechanisms that allow IPv4 computing systems to communicate with IPv6 computing systems even when the IPv4 computing system is behind a NAT, and that allow IPv4 computing systems being NATs to communicate directly with other IPv4 computing systems that are also behind NATs.

BRIEF SUMMARY OF THE INVENTION

In accordance with one aspect of the principles of the present invention, the invention may be implemented in a network environment such as the Internet. The Internet includes an IPv6 Internet in which a number of IPv6 computing systems communicate using IPv6. The Internet also includes a number of IPv4 computing systems that communicate using IPv4 thereby forming an IPv4 Internet. The IPv4 Internet includes a server and a relay that are each capable of communicating over both the IPv4 Internet and the IPv6 Internet. The IPv4 Internet includes a private network that is behind a network address translator (also referred to herein as a "NAT"). The server and relay facilitate communication between an IPv4 client in the private network and an IPv6 client in the IPv6 Internet despite the clients using differing versions of the IP protocol in order to communicate. Furthermore, the server and relay facilitate this communication in a manner that reduces server workload so as to increase scalability of the server.

First, the IPv4 client obtains an IPv6 address. The IPv4 client generates an IPv4 message that includes an IPv4 header containing its IPv4 address and port as the source IPv4 address and port, and that contains the IPv4 address and port of the server as the destination IPv4 address and port. The IPv4 message also includes an IPv4 payload that includes the IPv6 address of the IPv4 client and that of the IPv6 client. The IPv4 client then transmits that IPv4 message to the server.

The NAT intercepts the IPv4 message and replaces the source IPv4 address and port with a mapped IPv4 address and port of the network address translator, and forwards the mapped IPv4 message to the server. At this stage, while there may be an IPv4 payload, the IPv4 payload includes an IPv6 message that include little, if any IPv6 payload.

Upon receiving the mapped IPv4 message, the server generates an IPv6 message that is derived from the mapped IPv4 message. For instance, the IPv6 address of the IPv4 client is the source IPv6 address in the IPv6 message. The IPv6 message further includes the IPv6 address of the IPv6 client as the destination IPv6 address in the IPv6 message. The server then transmits that IPv6 message to the IPv6 client.

The IPv6 client receives the IPv6 message and generates an IPv6 response by switching the source and destination IPv6 addresses, and then dispatches that IPv6 response towards the IPv4 client.

The relay intercepts the IPv6 response and determines that the destination IPv6 address included in the IPv6 response corresponds to an IPv4 computing system. The relay then identifies the mapped IPv4 address and port of the IPv4 client based on the destination IPv6 address in the IPv6 response. If the NAT is not a cone NAT, the relay constructs an IPv4 response based on the IPv6 response by including the IPv4 address and port of the relay as the source, and including the IPv4 address and port of the server as the destination. The IPv4 response also includes a payload that includes the IPv6 address of both the IPv6 client and the IPv4 client. The relay transmits the generated IPv4 response to the server.

Upon receiving the IPv4 response, the server replaces the source IPv4 address and port with the IPv4 address and the port, respectively, of the server, and replaces the destination IPv4 address and port in the IPv4 response with the mapped IPv4 address and port of the IPv4 client. The server also includes an IPv4 payload in the IPv4 response that includes the IPv4 address and port of the relay computing system. The server then transmits the modified response to the NAT.

The NAT maps the destination address and port to that of the IPv4 client, whereupon the IPv4 client receives the IPv4 response. Since the IPv4 client is now apprised of the IPv4 address and port of the relay, the IPv4 client may communicate directly with the relay when communicating with the IPv6 client without burdening the server. The initial communications with the server also need not have significant, if any, IPv6 payload. Accordingly, the server may scale to a large number of similar IPv4 clients to provide IPv6 communication services.

If the relay, upon receiving the IPv6 response, instead determines that the NAT is a cone NAT, the IPv4 response need not be routed via the server, but may be transmitted directly to the IPv4 client. In that scenario, the IPv4 client may determine the IPv4 address and port of the relay based on the source IPv4 address and port in the IPv4 response. This further reduces server workload since the IPv4 response need not be processed by the server.

In accordance with a second aspect of the present invention, the IPv6 client may initiate communication with the IPv4 client. In that case, the IPv6 client first dispatches an IPv6 message to the IPv4 client. The IPv6 message may include IPv6 payload that represents data to be conveyed to the IPv4 client. The relay intercepts the IPv6 message and determining that the destination IPv6 address included in the IPv6 message corresponds to an IPv4 client. The relay then queues at least the IPv6 payload of the IPv6 message.

The relay constructs an IPv4 message based on the IPv6 message. The IPv4 message includes an IPv4 address and a port of the relay as a source IPv4 address and port, and an IPv4 address and a port of the server as a destination IPv4 address and port, respectively. The IPv4 message also includes the IPv6 address of the IPv6 client and the IPv6 address of the IPv4 client. The relay identifies the IPv4 address and the port of the server based on the destination IPv6 address in the IPv6 message. The relay then transmits the IPv4 message to the server while the IPv6 payload remains queued at the relay.

The server receives the IPv4 message and replacing the source IPv4 address and the source port in the IPv4 message with the IPv4 address and the port, respectively, of the server, and replaces the destination IPv4 address and the destination port in the IPv4 message with the IPv4 address and the port, respectively, of the network address translator. The server also includes an identification of the IPv4 address and port of the relay to generate a first modified IPv4 message. The server then transmits the modified IPv4 message to the network address translator.

The network address translator receives the first modified IPv4 message and replaces the destination IP address and destination port in the first modified IPv4 message with the IPv4 address and the port of the IPv4 client. The network address translator then transmits the second modified IPv4 message to the IPv4 client.

The IPv4 client receives the modified IPv4 message and then generates an IPv4 response thereto. The IPv4 response includes the IPv4 address and the port of the IPv4 client as a source address and port, and includes the IPv4 address and the port of the relay as a destination address and port. The IPv4 client then dispatches the IPv4 response to the relay.

The network address translator intercepts the IPv4 response and replaces the source IPv4 address and the source port with the IPv4 address and port, respectively, of the network address translator to thereby generate a mapped IPv4 response. The network address translator then forwards the first modified IPv4 response to the relay.

The relay dequeues the IPv6 payload in response to having received the IPv4 response, and then constructs a second IPv4 message that includes the IPv4 address and the port of the relay as the source IPv4 address and port, and that includes the mapped IPv4 address and port of the IPv4 client as the destination IPv4 address and port. The second IPv4 message further includes the IPv6 address of the IPv6 client, the IPv6 address of the IPv4 client, and the IPv6 payload. The relay then dispatches the second IPv4 message to the IPv4 client.

The network address translator receives the second IPv4 message and replaces the destination IP address and destination port in the second IPv4 message with the IPv4 address and the port of the IPv4 client, respectively, to generate a modified version of the second IPv4 message. The network address translator then forwards the second IPv4 message to the IPv4 client, whereupon the IPv4 client may access the included IPv6 payload that was to be communicated by the IPv6 client.

Accordingly, once again, the server was only used once and did not process any IPv6 payload. Furthermore, the relay and server may have different IP address thereby improving security.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8 illustrates a computing system that may be used as any of the computing systems previously illustrated.

DETAILED DESCRIPTION OF THE PREFERRED EMBODIMENTS

The principles of the present invention relate to mechanisms that allow an IPv4 client to communicate with an IPv6 client (and vice versa) with reduced server workload. Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 1:
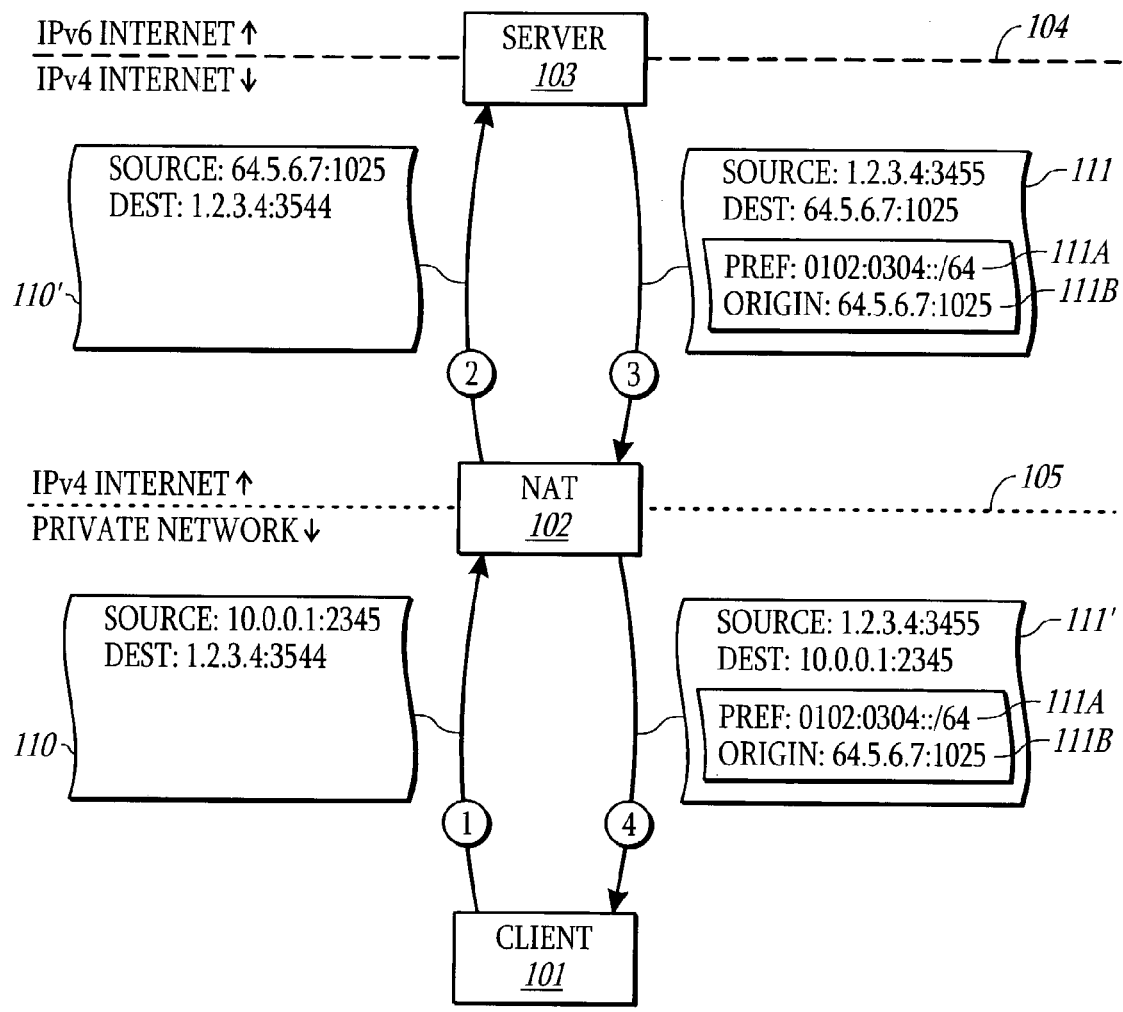
FIG. 1 illustrates a network environment in which an IPv4 client computing system obtains an IPv6 network address from a server computing system via a network address translator.

FIG. 1 illustrates a schematic of a network environment in which an IPv4 client that is behind a NAT may obtain an IPv6 address to further expedite communications with IPv6 computing systems. The network environment includes an IPv6 Internet illustrated as that portion that is above the dashed line 104, an IPv4 Internet illustrated as that portion between the dashed line 104 and the dotted line 105, and a private network illustrated as that portion below the dotted line 105.

The IPv6 Internet includes all those computing systems on the Internet that are capable of communicating using the IPv6 network protocol. The IPv4 Internet includes all those computing systems on the Internet that are capable of communicating using the IPv4 network protocol. There may be some computing systems that are capable of interfacing with other computing systems using either IPv4 or IPv6. Those computing systems may reside in both the IPv6 Internet and the IPv4 Internet. For example, server 103 is capable of communicating using both IPv6 and IPv4.

A Network Address Translator (NAT) 102 resides between the private network and the global IPv4 network and has a limited number of (potentially even just one) global IPv4 addresses that it may expose to identify itself globally outside the private network. The client 101 within the private network has a private address that may not be globally unique outside of the private network. However, when sending a message outside of the private network, the NAT 102 provides on the fly transformations to the message in which it replaces the private network address that identifies the client with a globally unique network address that identifies the NAT 102.

The NAT 102 also retains a mapping between that private network address and the replacement globally unique network address. Accordingly, when the NAT 102 receives a response to the message over the IPv4 Internet, the NAT 102 will use the mapping to appropriately route the response back to the client. Accordingly, computing systems outside of the private network only have to deal with the globally unique network address, while allowing the client to retain a separate private network address that need not be globally unique.

In order to participate in communications with IPv6 computing systems, the client 101 first obtains an IPv6 network address. This address acquisition procedure involves the client 101, the NAT 102 and the server 103 and may best be understood with reference to a specific procedural example described with reference to FIG. 1.

The client 101 dispatches a message to the server called herein a "router solicitation" message 110 that may be in the form of an IPv4 packet that includes a User Datagram Protocol (UDP) message. Suppose the client 101 has the private IPv4 network address 10.0.0.1, the NAT 102 may expose the globally unique IPv4 network address 64.5.6.7, and the server has the globally unique IPv4 network address 1.2.3.4. All IP addresses and UDP ports specifically mentioned herein are merely examples. Even though the client 101 has this IPv4 address, the client now desires an IPv6 network address. The router solicitation message 110 as initially dispatched by the client 101 will thus include a source address of 10.0.0.1 (i.e., the private network address of the client 101) and a source UDP port (e.g., 2345) and a destination address of 1.2.3.4 (i.e., the public network address of the server 103) and destination port (e.g. 3544)

As the router solicitation message passes 110 through the NAT 102, the NAT 102 intercepts the messages, establishes the mapping, and replaces the source address and UDP port to include instead a public address of the NAT 102 and a corresponding UDP port in accordance with the mapping. For example, router solicitation message 110 is altered to create mapped router solicitation message 110' that includes the public address 64.5.6.7 of the NAT 102 as the source address, instead of the private address 10.0.0.1 of the client 101. Furthermore, a source UDP port 1025 is used instead of the source UDP port 2345.

Upon receiving the router solicitation message 110', the server 103 notes the source address and port (e.g., 64.5.6.7: 1025), and sends back a response to that address and port. That response will also be referred to herein as a "router advertisement" message. The response includes a prefix assigned to the server 101, as well as an origin indication. For example, router advertisement message 111 includes a prefix 111A of "PREF:0102:0304::/64" and an origin indication 111B of "64.5.6.7:1025 ".

Figure 5:
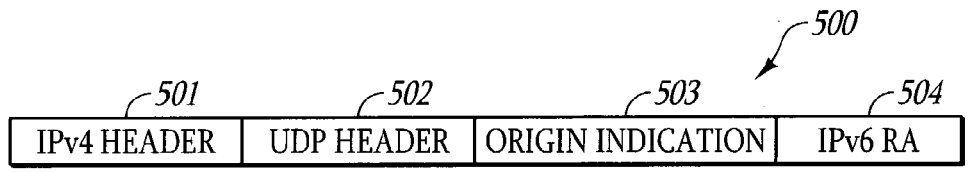
FIG. 5 illustrates a data structure of a router advertisement from which the IPv4 client may construct an IPv6 address.

An example format of the router advertisement message 111 is illustrated in FIG. 5 as data structure 500. The IPv4 header field 501 includes IPv4 header information such as the source and destination IPv4 address and port. The UDP header field 502 contains UDP header information. The origin indication field 503 includes the mapped address and port associated with the NAT 102 and client 101. The IPv6 RA field 504 includes the prefix associated with the server 103.

Upon receiving the router advertisement message 111, the NAT 102 recognizes that this is a response to the message from client 101 and then uses the mapping to replace the destination address and port in the response to generate unmapped router advertisement message 111'. Optionally, the router solicitation message and router advertisement message may include a secret key and key identifier for enhanced security.

Figure 7:
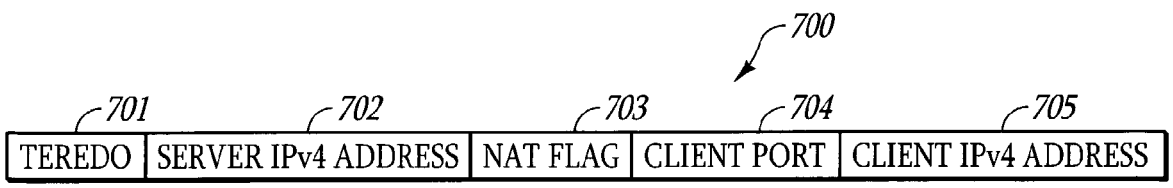
FIG. 7 illustrates a data structure of an IPv6 address in accordance with a fourth aspect of the present invention.

The client 101 then constructs its own IPv6 address, which in this example may be "PREF:102:304::FBFE: BFFA:F9F8". More generally, the IPv6 address may have a general structure illustrated in FIG. 7 as data structure 700. A service field 701 identifies that this IPv6 address corresponds to an IPv4 client. For example, in the IPv6 address "PREF:102:304::FBFE:BFFA:F9F8", the "PREF" represents the service field 701. A server IPv4 address field 702 identifies the IPv4 address of the server 103. For example, the "102:304" in the example IPv6 address is the hexadecimal notation of the address of the server 103 (namely, 1.2.3.4). A NAT flag field 703 may identify whether or not the NAT 102 is a cone NAT. A client port field 704 identifies the mapped port (e.g., UDP port) of the client 101. For example, the "FBFE" in the example IPv6 address is the mapped port 1025 exclusive OR'ed with hexadecimal number "FFFF". A client IPv4 address field 705 identifies the IPv4 address of the client 101. For example, the "BFFA: F9F8" in the example IPv4 address is the mapped address 64.5.6.7 exclusive OR'ed with hexadecimal number "FFFF: FFFF". Accordingly, the mapped address of client 101, the mapped port of client 101, the prefix of the server 103, and the address of the server 103 may all be extracted from the client's IPv6 address. The client 101 is now properly provisioned to communicate with IPv6 computing systems according to the methods described further below.

As another preliminary step, the client 101 may determine whether or not the NAT 102 is a cone NAT or a non-cone NAT. Client located behind cone NATs can receive messages directly. Accordingly, there may be some optimizations available to the client if located behind a cone NAT. If the client 101 is located behind a cone NAT, it uses an address having a cone flag in NAT flag field 703 that is set to one.

In order to determine the type of NAT, the client 101 first sends the router solicitation message from a link-local address in which the cone bit is set to one. When the server 103 observes that the cone bit is set to one, it sends the router advertisement in a UDP packet from a secondary IPv4 address. The secondary IPv4 address is a different IPv4 address than the IPv4 address assigned to the server 103 to which the router solicitation message was sent. The client 101 will only receive this router advertisement if the NAT 102 is a cone NAT. In consequence, if the client receives the router advertisement, the client 101 may infer that the NAT 102 is a cone NAT and this preliminary act is completed.

If the client 101 does not receive the router advertisement, the client 101 sends another router solicitation message in which the cone bit is set to zero. The server 103 detects the cone bit set to zero, and then sends the router advertisement from its assigned IPv4 address. The router advertisement should be received by a client behind a non-cone NAT. Accordingly, if the client 101 receives this second router advertisement, the client 101 may infer that the NAT 102 is a non-cone NAT.

The service does not work if the client 101 is located behind a symmetric NAT. Accordingly, the client 101 does one further step after receiving the router advertisement from the server 103 using the server's assigned IPv4 address. Specifically, the client 101 sends a router solicitation message to the secondary IPv4 address of the server 103. The client 101 then receives a router advertisement in response. The client 101 then compares the mapped address and port of the two received router advertisement. If they are different, the client 101 detects that it is behind a symmetric NAT, and thus cannot use the service. Otherwise, the client 101 detects that it is behind a non-code NAT that is not a symmetric NAT and this preliminary act is complete.

Figure 2:
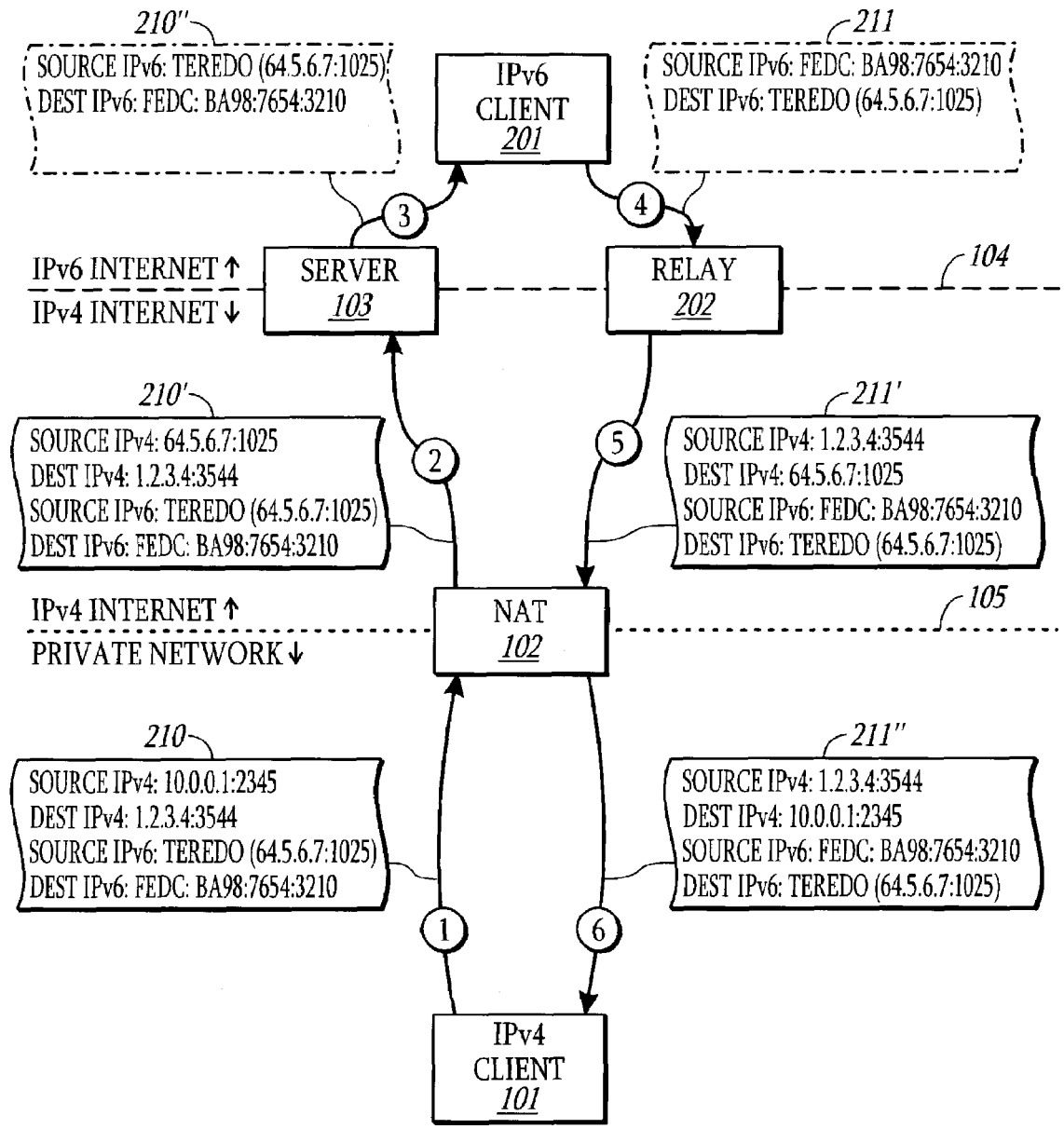
FIG. 2 illustrates a network environment in which the IPv4 client establishes communication with an IPv6 client computing system.

FIG. 2 illustrates a network environment in which the client 101 communicates with an IPv6 computing system 201 (hereinafter also referred to as an "IPv6 client") residing in the IPv6 Internet, even though the client 101 resides in a private network behind the NAT. In this description and in the claims, the use of the term "client" and "server" are used to represent that the client receives a particular service, while the server provides that service. The client may act as a server for other clients and for other services.

Once again, the client 101 is behind a NAT 102 on a private network and is capable of interface using the IPv4 network protocol. The server 103 is also present. In addition, the network includes an IPv6 client 201 that the IPv4 client 101 desires to communicate with despite the fact that the IPv6 client 201 interfaces using the IPv6 network protocol. The relay 202 is capable of interfacing using both IPv4 and IPv6. A method for bi-directional IP-based communication between the IPv4 client 101 and the IPv6 client 201 will now be described with reference to FIG. 2.

Figure 6:
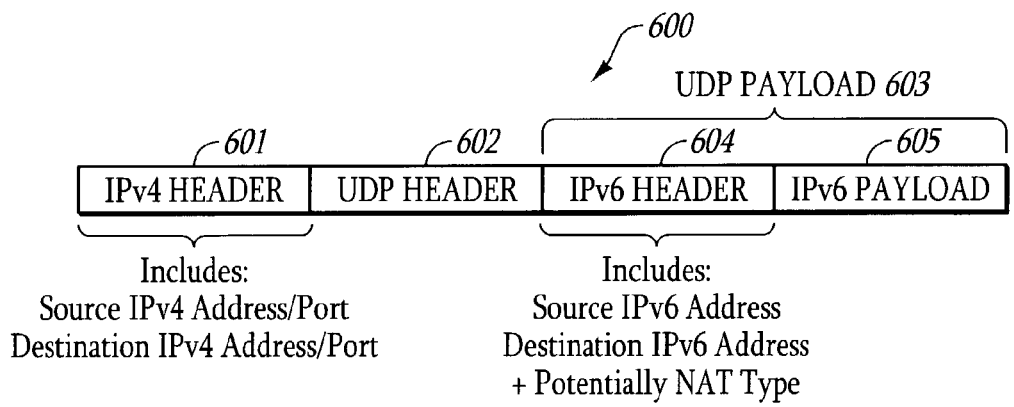
FIG. 6 illustrates a data structure of an IPv4 message that includes IPv6 information.

In performing the method, a general IPv4 message data structure 600 as illustrated in FIG. 6 is used for communication in the private network and in the IPv4 Internet, but not in the IPv6 Internet. The data structure 600 includes an IPv4 header field 601, which includes the source IPv4 address and port, and the destination IPv4 address and port. The UDP header field 602 includes UDP header information. The UDP payload field 603 includes an IPv6 header field 604 that includes the source IPv6 address and the destination IPv6 address, as well as a NAT type indicator or flag that helps identify whether or not the NAT 102 is a cone-NAT. The UDP payload 603 also includes an IPv6 payload field 605 which, in some embodiments, may be empty. An IPv4 message with an empty IPv6 payload field may also be referred to herein as a "bubble" message.

As the source IPv4 address and port, destination IPv4 address and port, source IPv6 address, and destination IPv6 address are important fields and are often transformed during the message flow, these fields will be tracked through an example in which a message is sent from IPv4 client 101 to IPv6 client 201, and in which a response is sent from IPv6 client 201 to IPv4 client 101.

In order to send a message from client 101 to IPv6 client 201, the client 101 first sends an IPv4 message to NAT 102. The IPv4 message at this stage is represented in FIG. 2 as message 210. The IPv4 message may have the structure illustrated and described above with respect to FIG. 6 and initially contains the following field values.

| | |
|---|---|
| Source IPv4 Address and Port: | 10.0.0.1:2345 |
| Destination IPv4 Address and Port: | 1.2.3.4:3544 |
| Source IPv6 Address: | Teredo(64.5.6.7:1025) |
| Destination IPv6 Address: | ::FEDC:BA98:7654:3210 |

Note that the destination IPv4 address and port are that of the server 103 rather than the ultimate destination; namely, the IPv6 client 201. The IPv6 client 201 presumably has no IPv4 address since it is not in the IPv4 Internet. Note also that the Source IPv6 address is listed as Teredo(64.5.6.7:1025). This means that the IPv6 address is the IPv6 address that the IPv4 client 101 derived in the above-described manner given that its mapped address and port were 64.5.6.7:1025. In particular, the address "Teredo(64.5.6.7:1025)" is the same as the address "PREF:102:304::FBFE:BFFA:F9F8" as described above. The destination IPv6 address "::FEDC:BA98:7654:3210" is provided by way of being an example of the IPv6 address of the IPv6 client 201 and may be determined from an address or domain name server or in some other manner. The principles of the present invention apply regardless of the exact IPv6 address of the IPv6 client 201.

The NAT 102 replaces the source IPv4 address and port with the mapped source IPv4 address and port to generate message 210' as illustrated in FIG. 2, which includes the following values:

| | |
|---|---|
| Source IPv4 Address and Port: | 64.5.6.7:1025 |
| Destination IPv4 Address and Port: | 1.2.3.4:3544 |
| Source IPv6 Address: | Teredo(64.5.6.7:1025) |
| Destination IPv6 Address: | ::FEDC:BA98:7654:3210 |

Note the change in the Source IPv4 Address and Port.

Until now, the communication has been using IPv4 since communication has remained within the IPv4 Internet. However, the server 103 then sends an IPv6 message to the IPv6 client 201 over the IPv6 Internet. Accordingly, the server 103 constructs an IPv6 message 210" using the information in the IPv4 message 210' received from the NAT 102. In the example, the following values would be included in the IPv6 header of the IPv6 message:

| | |
|---|---|
| Source IPv6 Address: | Teredo(64.5.6.7:1025) |
| Destination IPv6 Address: | ::FEDC:BA98:7654:3210 |

Now that communication is occurring over the IPv6 Internet, there is no need for the IPv4 source or destination addresses or ports to be included. In FIG. 2, all IPv6 messages are represented with intermittent dashed/dotted lines, as contrasted with IPv4 message which are represented with solid lines.

The IPv6 client 201 then receives the IPv6 message 210", which has the appearance of being sent directly from the IPv4 client 101 since the source IPv6 address is indeed listed as the IPv6 address of the IPv4 client 101. The IPv6 client 201 processes the message and returns a response 211, which has the following values:

| | |
|---|---|
| Source IPv6 Address: | ::FEDC:BA98:7654:3210 |
| Destination IPv6 Address: | Teredo(64.5.6.7:1025) |

The response 211 is dispatched according to regular IPv6 rules. Accordingly, the IPv6 client 201 may receive IPv6 messages from and send IPv6 messages to the IPv4 client 101 following regular IPv6 rules as a regular IPv6 client would normally be configured to do.

The response 211 is first received by a relay 202, which notices, based on the prefix in the destination IPv6 address, that the destination address corresponds to an IPv4 client. Accordingly, the relay 202 reconfigures the IPv6 message back into an IPv4 message that has the data structure illustrated and described with respect to FIG. 6. In particular, the IPv6 response 211 is modified into IPv4 response 211', which has the following values:

| | |
|---|---|
| Source IPv4 Address and Port: | 1.2.3.4:3544 |
| Destination IPv4 Address and Port: | 64.5.6.7:1025 |
| Source IPv6 Address: | ::FEDC:BA98:7654:3210 |
| Destination IPv6 Address: | Teredo(64.5.6.7:1025) |

In the embodiment of FIG. 2, the relay 202 assumes the same address and port as the server 103. Accordingly, the source IPv4 address and port of the relay 202 may be, by default, the same source IPv4 address and port (i.e., 1.2.3.4:3544) as does the server 103. The destination IPv6 address and port may be derived from the destination IPv6 address "Teredo(64.5.6.7:1025)".

The IPv4 response 211' is then received by the NAT 102, which replaces the globally unique destination address with its corresponding mapped private network address to generate a response 211" having the following values:

| | |
|---|---|
| Source IPv4 Address and Port: | 1.2.3.4:3544 |
| Destination IPv4 Address and Port: | 10.0.0.1:2345 |
| Source IPv6 Address: | ::FEDC:BA98:7654:3210 |
| Destination IPv6 Address: | Teredo(64.5.6.7:1025) |

The IPv4 client 101 then receives the IPv4 response 211". Accordingly, IPv4 client initiated bi-directional communication is enabled with an IPv6 client even though the IPv4 client is behind a NAT.

Figure 3A:
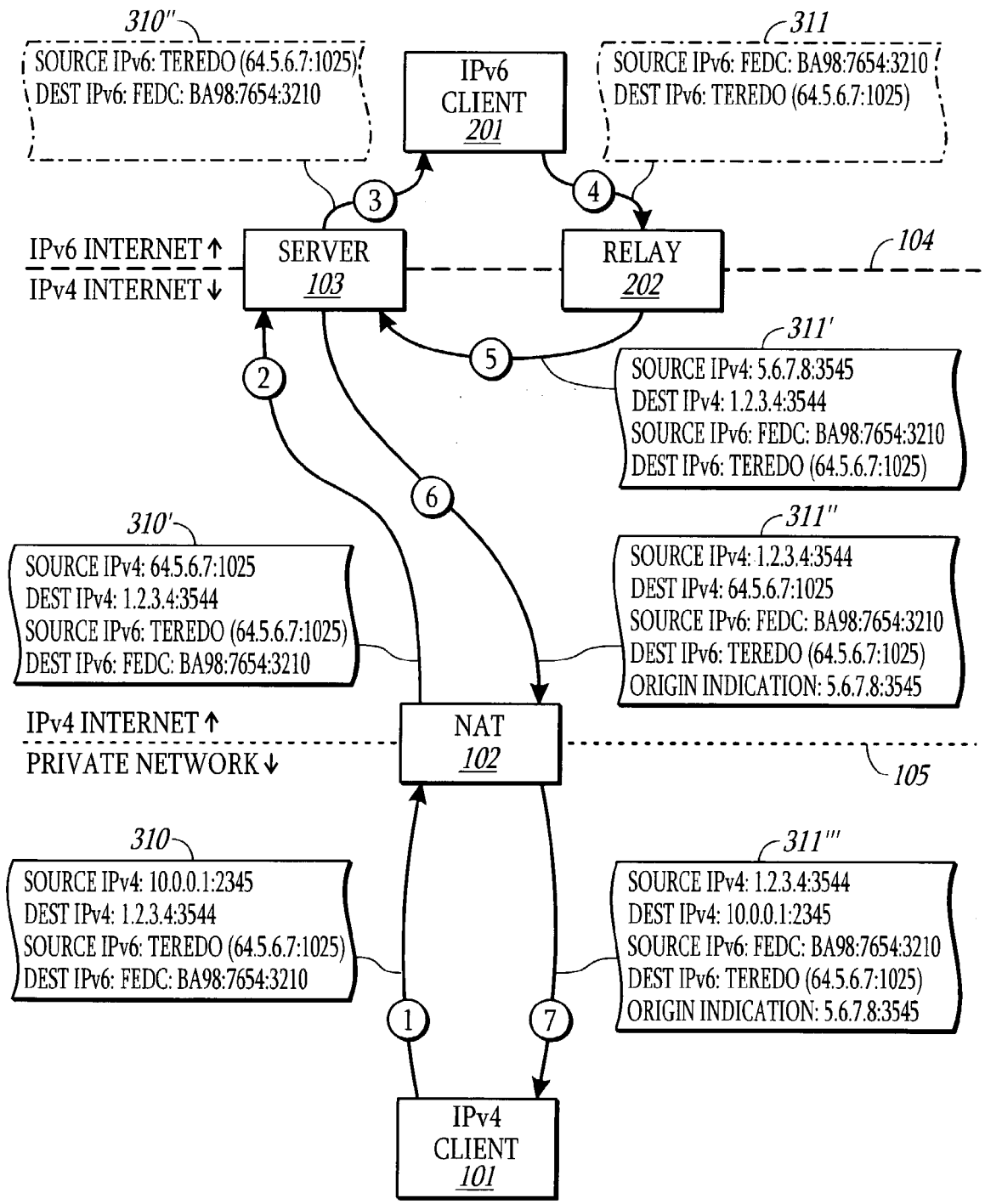
FIG. 3A illustrates a network environment in which the IPv4 client establishes communication with an IPv6 client while reducing the workload of the server computing system in accordance with the present invention.

In one modification of this procedure, the load on the server 103 may be significantly reduced by having the IPv4 client 101 use a special echo request that is transmitted toward IPv6 client 201 to thereby discover the IPv4 address and port of the relay 202. FIG. 3A illustrates the message flow corresponding to this use of the echo request.

In order to learn the IPv4 address of the relay that is closest to the IPv6 client 201 with whom the IPv4 client 101 is to communicate, the IPv4 client 101 sends a message 310 (also referred to herein as an IPv4 "echo request") towards IPv6 client 201. In an example that is similar to the previous example, the echo request carries the following values:

| | |
|---|---|
| Source IPv4 Address and Port: | 10.0.0.1:2345 |
| Destination IPv4 Address and Port: | 1.2.3.4:3544 |
| Source IPv6 Address: | Teredo(64.5.6.7:1025) |
| Destination IPv6 Address: | ::FEDC:BA98:7654:3210 |

The NAT 102 replaces the source IPv4 address and port with the mapped address and port to obtain the following values as also represented by echo request 310' in FIG. 3A:

| | |
|---|---|
| Source IPv4 Address and Port: | 64.5.6.7:1025 |
| Destination IPv4 Address and Port: | 1.2.3.4:3544 |
| Source IPv6 Address: | Teredo(64.5.6.7:1025) |
| Destination IPv6 Address: | ::FEDC:BA98:7654:3210 |

The server 103 discards the IPv4 address information and transforms the IPv4 address into an IPv6 echo request 310" having the following values:

| | |
|---|---|
| Source IPv6 Address: | Teredo(64.5.6.7:1025) |
| Destination IPv6 Address: | ::FEDC:BA98:7654:3210 |

The IPv6 echo request 310" is then sent to the IPv6 client 201. The IPv6 client responds with an IPv6 response 311 to the echo message, which includes the following values:

| | |
|---|---|
| Source IPv6 Address: | ::FEDC:BA98:7654:3210 |
| Destination IPv6 Address: | Teredo(64.5.6.7:1025) |

The relay 202 receives the response 311. Up until this point, the procedure has been very similar to that described above for FIG. 2 with two major exceptions. First, the IPv4 address of the relay 202 is not the same as the IPv4 address of the server 103. Second, the IPv6 payload within the IPv4 packet may be empty or contain minimal information. The advantage of these two differences will be described further below.

The relay 202 detects the presence of the prefix associated with the server 103 encoded within its destination IPv6 address. Recall that the Teredo(64.5.6.7:1025) address equates to "PREF:102:304::FBFE:BFFA:F9F8" (underlining added to emphasize that the address 1.2.3.4 may be derived from the destination address). Since the relay 202 had not previously received any direct messages from IPv4 client 101, the relay 202 sends the response to the server 103 over UDP to the address of server 103 (e.g., 1.2.3.4:3544). The modified response 311' would have the following values:

| | |
|---|---|
| Source IPv4 Address and Port: | 5.6.7.8:3545 |
| Destination IPv4 Address and Port: | 1.2.3.4:3544 |
| Source IPv6 Address: | ::FEDC:BA98:7654:3210 |
| Destination IPv6 Address: | Teredo(64.5.6.7:1025) |

Note that the IPv4 message includes the IPv4 address and port of the relay 202 (i.e., 5.6.7.8:3455), just what the IPv4 client 101 was trying to discover. The server then repackages the IPv4 response to include the following values:

| | |
|---|---|
| Source IPv4 Address and Port: | 1.2.3.4.3544 |
| Destination IPv4 Address and Port: | 64.5.6.7:1025 |
| Source IPv6 Address: | ::FEDC:BA98:7654:3210 |
| Destination IPv6 Address: | Teredo(64.5.6.7:1025) |
| Origin Indication: | 5.6.7.8:3545 |

Note that the IPv4 address of the relay 202 is preserved within an origin indication field that may be included as part of the UDP payload along with the Source and Destination IPv6 addresses. This modified response is represented in FIG. 3A as response 311".

The NAT 102 receives the response 311", replaces the destination IPv4 address and port with the mapped IPv4 address and port to generate response 311'" which has the following values in the example:

| | |
|---|---|
| Source IPv4 Address and Port: | 1.2.3.4:3544 |
| Destination IPv4 Address and Port: | 10.0.0.1:2345 |
| Source IPv6 Address: | ::FEDC:BA98:7654:3210 |
| Destination IPv6 Address: | Teredo(64.5.6.7:1025) |
| Origin Indication: | 5.6.7.8:3545 |

When IPv4 client 101 receives the response 311'", it will have learned that relay 202 can possible be reached through IPv4 address and port 5.6.7.8:3545. If there was any IPv6 payload included in the IPv4 echo request 310, the IPv4 client 101 may also compare the IPv6 payload of the response 311'" to verify that it has been unchanged. An unchanged payload would give some assurance that the response did, in fact, originate from IPv6 client 201. Once the knowledge of the IPv4 address and port of the relay 202 has been learned, the IPv4 client 101 may directly communicate over IPv4 with the relay 202 and need not burden the server 201 any further with communications to the IPv6 client 201.

This method would be followed if the IPv6 address of the IPv4 client 101 indicates that the client is located behind a non-cone, non-symmetric NAT (i.e., the cone bit in the address is set to zero). If the IPv6 address of the IPv4 client 101 indicates that the IPv4 client 101 is located behind a cone NAT (i.e., the cone bit is set to one), the relay 202 would receive the response 311 to the echo request message, but would not send the response 311' to the server 103. Instead, the relay 202 would send a response directly to the IPv4 client 101. In that case, the IPv4 client 101 may identify the IPv4 address and port from the source IPv4 address and port present in the response as forwarded from the relay 202. Once again, the IPv4 client 101 may now communicate directly over IPv4 with the relay 202 and need not burden the server 103 any further.

Figure 3B:
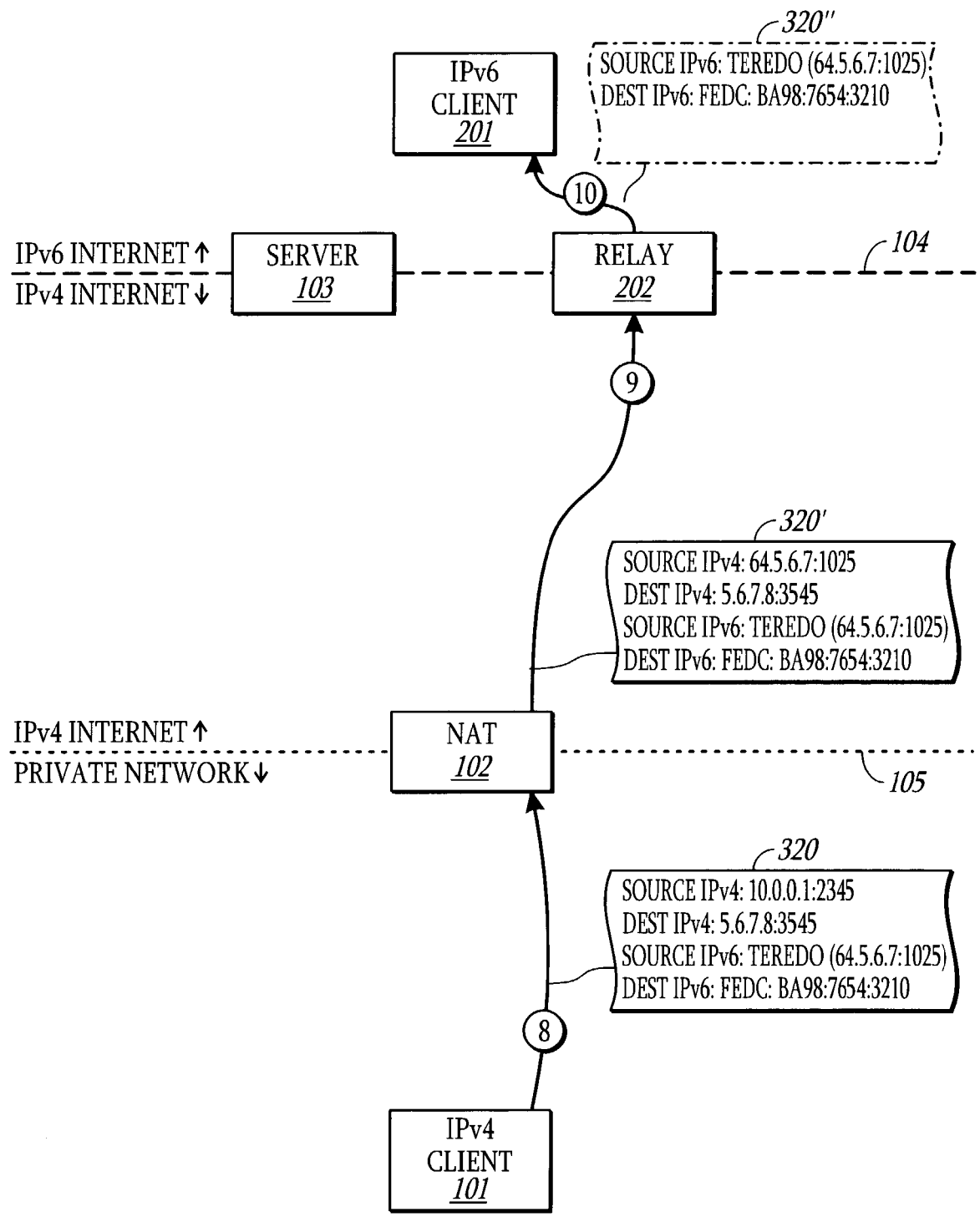
FIG. 3B illustrates the network environment after the communications illustrated and/or described with respect to FIG. 3A, in which the IPv4 client is now able to communicate with the IPv6 client via the relay without the use of the server.

At this stage, the IPv4 client 101 has learned of the IPv4 address and port of the relay 202. Accordingly, the IPv4 client 101 may communicate with the IPv6 client directly through the relay 202 without the further assistance of the server 103. This process is illustrated in FIG. 3B.

In the example, the IPv4 client 101 sends a message 320 (which may now include substantial IPv6 payload) to the IPv6 client. The message 320 has the following values:

| | |
|---|---|
| Source IPv4 Address and Port: | 10.0.0.1:2345 |
| Destination IPv4 Address and Port: | 5.6.7.8:3545 |
| Source IPv6 Address: | Teredo(64.5.6.7:1025) |
| Destination IPv6 Address: | ::FEDC:BA98:7654:3210 |

Note that the IPv4 client 101 learned of the destination IPv4 Address and port from the original indication field in the response 311" if the NAT 102 is a non-cone, non-symmetric NAT. If the NAT 102 was a cone NAT, then the destination IPv4 address and port may be learned from the source IPv4 address and port that would have been sent directly to the IPv4 client from the relay 202.

The NAT intercepts the message and replaces the source IPv4 address and port with the mapped IPv4 address and port to generate a mapped IPv4 message 320' having the following values:

| | |
|---|---|
| Source IPv4 Address and Port: | 64.5.6.7:1024 |
| Destination IPv4 Address and Port: | 5.6.7.8:3545 |
| Source IPv6 Address: | Teredo(64.5.6.7:1025) |
| Destination IPv6 Address: | ::FEDC:BA98:7654:3210 |

The relay 202 receives this message 320' and generates an IPv6 message 320" by stripping the IPv4 address and port information and using the source and destination IPv6 addresses embedded in the IPv4 payload of the message 320' as the source and destination IPv6 addresses, respectively, of the IPv6 message 320".

Accordingly, the workload of the server is reduced for two reasons. First, the server 103 is only used until the IPv4 client 101 has discovered the IPv4 address and port of the relay 202 associated with an IPv6 client 201 of interest. Then, the server 103 need not be involved in future communications with that server 103. Second, even the IPv4 messages that passed through the server 103 before the relay was discovered need not have any IPv6 payload at all, or may have a minimal IPv6 payload. Accordingly, the processing of the server 103 needed per IPv4 message is reduced.

Figure 4:
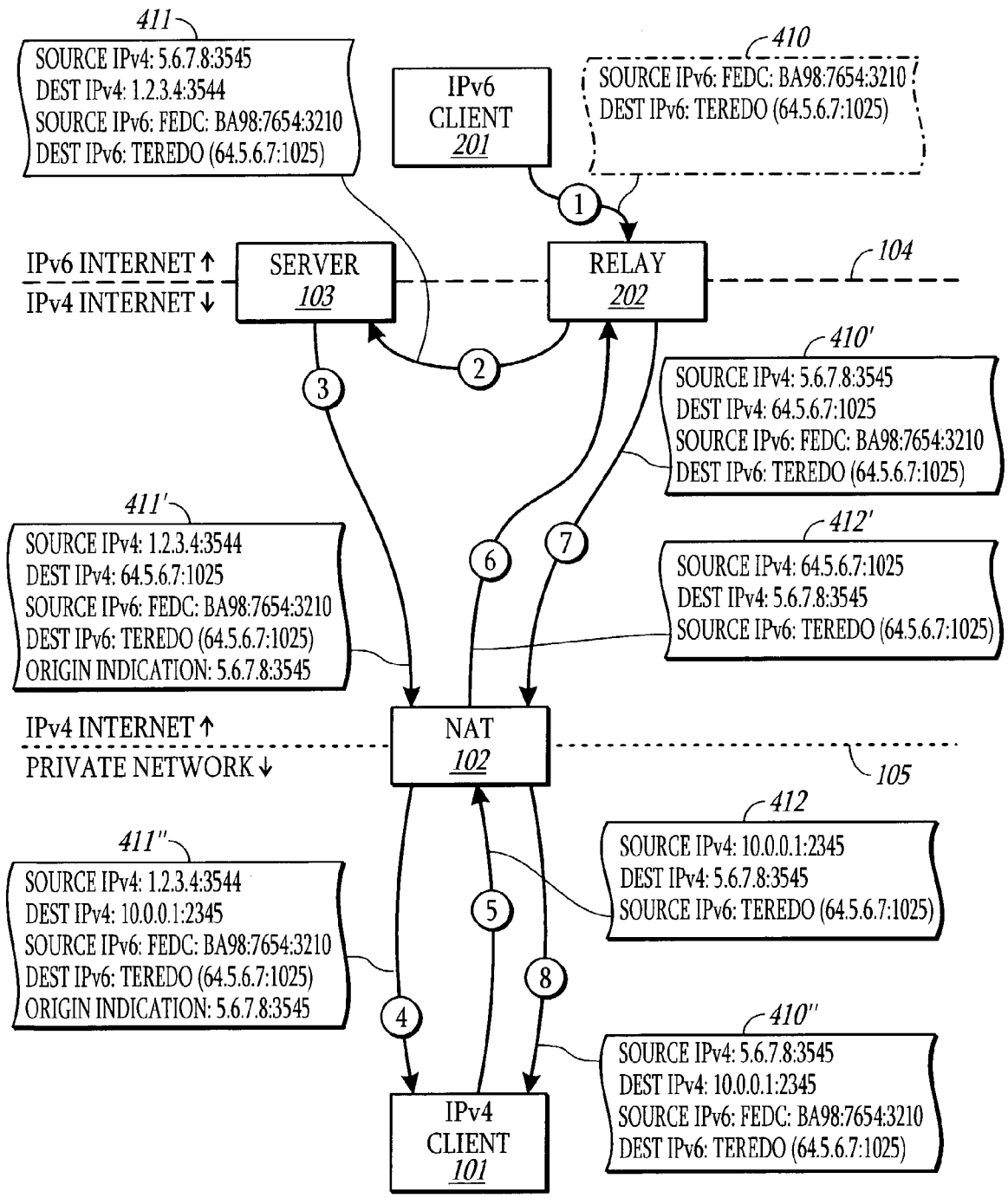
FIG. 4 illustrates a network environment in which the IPv6 client establishes communication with an IPv4 client while reducing the workload of the server computing system in accordance with the present invention.

As one additional advantage to this modification, note that the IPv4 address and port of the relay 202 is different than the IPv4 address and port of the server 103. This promotes a higher level of security as compared to assigning the relay 202 and the server 103 the same IPv4 address and port. FIG. 4 illustrates a message flow that allows the IPv6 client 201 to initiate communication with the IPv4 client 101. In this embodiment as well, the IPv4 address of the relay 202 is not the IPv4 address of the server 103 thereby promoting security.

After discovering the IPv6 address of the IPv4 client 101, which may be accomplished using standard address discovery techniques such as domain name servers, the IPv6 client 201 dispatches an IPv6 message to the IPv4 client 101. This IPv6 message first passes through the relay associated with the IPv6 server. For example, referred to FIG. 4, the IPv6 client sends the IPv6 message 410 to the relay 202. The fields within the IPv6 message will have the following values:

| | |
|---|---|
| Source IPv6 Address: | ::FEDC:BA98:7654:3210 |
| Destination IPv6 Address: | Teredo(64.5.6.7:1025) |

There may also be an IPv6 payload included in the IPv6 message 410 in the form of the actual data desired to be communicated to the IPv4 client 101.

The relay 202 then queues the IPv6 message (or at least the source IPv6 address, the destination IPv6 address, and the IPv6 payload associated with the IPv6 message). As the IPv6 message remains queued, the relay 202 sends an IPv4 message 411 to the server 103. The IPv4 message 411 need not have any of the IPv6 payload. In the example, the fields within the IPv4 message appear as follows:

| | |
|---|---|
| Source IPv4 Address and Port: | 5.6.7.8:3545 |
| Destination IPv4 Address and Port: | 1.2.3.4:3544 |
| Source IPv6 Address: | ::FEDC:BA98:7654:3210 |
| Destination IPv6 Address: | Teredo(64.5.6.7:1025) |

Note that the relay 202 may derive the destination IPv4 address and port from the destination IPv6 address due to the structure of the IPv6 address as explained further above. The server 103 then sends an IPv4 message 411' having the following fields to the NAT 102.

| | |
|---|---|
| Source IPv4 Address and Port: | 1.2.3.4:3544 |
| Destination IPv4 Address and Port: | 64.5.6.7:1025 |
| Source IPv6 Address: | ::FEDC:BA98:7654:3210 |
| Destination IPv6 Address: | Teredo(64.5.6.7:1025) |
| Origin Indication: | 5.6.7.8:3545 |

Note that the IPv4 address of the relay 202 is once again preserved within an origin indication field that may be included as part of the UDP payload along with the Source and Destination IPv6 addresses.

The NAT 102 receives the message 411', replaces the destination IPv4 address and port with the mapped IPv4 address and port to generate message 411" which has the following values in the example:

| | |
|---|---|
| Source IPv4 Address and Port: | 1.2.3.4:3544 |
| Destination IPv4 Address and Port: | 10.0.0.1:2345 |
| Source IPv6 Address: | ::FEDC:BA98:7654:3210 |
| Destination IPv6 Address: | Teredo(64.5.6.7:1025) |
| Origin Indication: | 5.6.7.8:3545 |

When IPv4 client 101 receives the response 411", it will have learned that relay 202 can possible be reached through IPv4 address and port 5.6.7.8:3545. Accordingly, the IPv4 client may construct an IPv4 message 412 having the following field values:

| | |
|---|---|
| Source IPv4 Address and Port: | 10.0.0.1:2345 |
| Destination IPv4 Address and Port: | 5.6.7.8:3545 |
| Source IPv6 Address: | Teredo(64.5.6.7:1025) |

The NAT 102 generates a mapped version of the message 412 in the form of message 412' having the following field values in the example:

| | |
|---|---|
| Source IPv4 Address and Port: | 64.5.6.7:1025 |
| Destination IPv4 Address and Port: | 5.6.7.8:3545 |
| Source IPv6 Address: | Teredo(64.5.6.7:1025) |

The relay 202 receives the message 412'. The relay 202 then dequeues the IPv6 message 410 and generates an IPv4 message 410' based on the IPv6 message 410. The IPv4 message 410' may have the following values:

| | |
|---|---|
| Source IPv4 Address and Port: | 5.6.7.8:3545 |
| Destination IPv4 Address and Port: | 64.5.6.7:1025 |
| Source IPv6 Address: | ::FEDC:BA98:7654:3210 |
| Destination IPv6 Address: | Teredo(64.5.6.7:1025) |

Additionally, the IPv4 message 410' may have the full IPv6 payload of the original IPv6 message 410.

The NAT 102 maps the destination IPv4 address and port to the private destination IPv4 address and port of the IPv4 client to generate modified message 410" having the following values:

| | |
|---|---|
| Source IPv4 Address and Port: | 5.6.7.8:3545 |
| Destination IPv4 Address and Port: | 10.0.0.1:2345 |
| Source IPv6 Address: | ::FEDC:BA98:7654:3210 |
| Destination IPv6 Address: | Teredo(64.5.6.7:1025) |

This mapping occurs because the NAT 102 will have already established an address mapping for the IPv4 client 101 for use in communications from relay 202, for example, when the message 412 was mapped to the message 412'.

In this case as well, the server 103 had to process only a single message 411' that did not include any IPv6 payload. From that point on, the server 103 was no longer needed to allow the IPv6 client 201 to communicate with the IPv4 client. Accordingly, server workload is preserved. Furthermore, the relay 202 has a different IPv4 address than the server 103 thereby improving security.

The various client, server, relay, and NAT computer systems described above may be structured as is now described with respect to the conventional computer 820 of FIG. 8, although that need not be the case. The computer 820 includes a processing unit 821, a system memory 822, and a system bus 823 that couples various system components including the system memory 822 to the processing unit 821.

The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disk drive 830 for reading from or writing to removable optical disk 831 such as a CD-ROM or other optical media. The magnetic hard disk drive 827, magnetic disk drive 828, and optical disk drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disk 831, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 839, magnetic disk 829, optical disk 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

While FIG. 8 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, a method for an IPv4 client within the private network establishing communication with an IPv6 client in the IPv6 Internet despite the IPv4 client being configured to communicate using IPv4, but not IPv6, despite the IPv4 client being behind the network address translator, and while reducing the workload of the server, the method comprising the following:

an act of the IPv4 client obtaining an IPv6 address;

an act of the IPv4 client generating an IPv4 message that includes an IPv4 header that includes an IPv4 address and a port of the IPv4 client as a source IPv4 address and a source port, respectively, the IPv4 header further including an IPv4 address and a port of the server as a destination IPv4 address and destination port, respectively, the IPv4 message further including an IPv4 payload that includes the IPv6 address of the IPv4 client and the IPv6 address of the IPv6 client in the IPv6 Internet;

an act of the IPv4 client transmitting the IPv4 message to the server;

an act of the network address translator intercepting the IPv4 message and replacing the source IPv4 address and the source port with the IPv4 address and port, respectively, of the network address translator to thereby generate a first modified IPv4 message;

an act of the network address translator forwarding the first modified IPv4 message to the server;

an act of the server computer system receiving the first modified IPv4 message and generating an IPv6 message that is derived from the first modified IPv4 message, the IPv6 message including the IPv6 address of the IPv4 client that was in the IPv4 payload of the IPv4 message as a source IPv6 address, the IPv6 message further including the IPv6 address of the IPv6 client that was in the IPv4 payload of the IPv4 message as a destination IPv6 address of the IPv6 message;

an act of the server transmitting the IPv6 message to the IPv6 client;

an act of the IPv6 client receiving the IPv6 message and generating an IPv6 response to the IPv6 message using the source IPv6 address included in IPv6 message as the destination IPv6 address, and using the destination IPv6 address included in the IPv6 message as the source IPv6 address;

an act of the IPv6 client dispatching the IPv6 response to the IPv4 client;

an act of the relay intercepting the IPv6 response and determining that the destination IPv6 address included in the IPv6 response corresponds to an IPv4 client;

an act of the relay identifying the IPv4 address and the port of the server based on the destination IPv6 address in the IPv6 response;

an act of the relay constructing an IPv4 response based on the IPv6 response, the IPv4 response including an IPv4 address and a port of the relay as a source IPv4 address and a source port, respectively, an IPv4 address and a port of the server as a destination IPv4 address a destination port, respectively, and having an IPv4 payload that includes the IPv6 address of the IPv6 client and the IPv6 address of the IPv4 client;

an act of the relay transmitting the IPv4 response to the server;

an act of the server receiving the IPv4 response and replacing the source IPv4 address and the source port in the IPv4 response with the IPv4 address and the port, respectively, of the server, and replacing the destination IPv4 address and the destination port in the IPv4 response with the IPv4 address and the port, respectively, of the network address translator, and including in the payload of the IPv4 response an identification of the IPv4 address and port of the relay to generate a first modified IPv4 response; and an act of the server transmitting the first modified IPv4 response to the network address translator;

an act of the network address translator receiving the first modified IPv4 response and replacing the destination IP address and destination port in the first modified IPv4 response with the IPv4 address and the port of the IPv4 client, respectively, to generate a second modified IPv4 response;

an act of the network address translator transmitting the second modified IPv4 response to the client; and an act of the IPv4 client receiving the second modified IPv4 response.

2. A method in accordance with claim 1, further comprising:

an act of the IPv4 client communicating the IPv6 client by sending IPv4 messages to the relay using the IPv4 address and port of the relay identified in the second modified IPv4 response.

3. In a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, a method for the server helping an IPv4 client within the private network establish communication with an IPv6 client in the IPv6 Internet despite the IPv4 client being configured to communicate using IPv4, but not IPv6, despite the IPv4 client being behind the network address translator, and while reducing the workload of the server, the method comprising the following:

an act of the server computer system receiving an IPv4 message that originated from the IPv4 client, and to which address mapping was performed by the network address translator, the IPv4 message including an IPv4 header that includes an IPv4 address and a port of the network address translator as a source IPv4 address and a source port, respectively, the IPv4 header further including an IPv4 address and a port of the server as a destination IPv4 address and destination port, respectively, the IPv4 message further including an IPv4 payload that includes an IPv6 address of the IPv4 client and an IPv6 address of the IPv6 client in the IPv6 Internet;

an act of the server generating an IPv6 message that is derived from the first modified IPv4 message, the IPv6 message including the IPv6 address of the IPv4 client that was in the IPv4 payload of the IPv4 message as a source IPv6 address, the IPv6 message further including the IPv6 address of the IPv6 client that was in the IPv4 payload of the IPv4 message as a destination IPv6 address of the IPv6 message;

an act of the server transmitting the IPv6 message to the IPv6 client;

an act of the server receiving an IPv4 response to the IPv6 message from the relay computer system, the IPv4 response including an IPv4 address and a port of the relay as a source IPv4 address and a source port, respectively, an IPv4 address and a port of the server as a destination IPv4 address and a destination port, respectively, and having an IPv4 payload that includes the IPv6 address of the IPv6 client and the IPv6 address of the IPv4 client;

an act of the server replacing the source IPv4 address and the source port in the IPv4 response with the IPv4 address and the port, respectively, of the server, and replacing the destination IPv4 address and the destination port in the IPv4 response with the IPv4 address and the port, respectively, of the network address translator, and including in the payload of the IPv4 response an identification of the IPv4 address and port of the relay to generate a first modified IPv4 response; and an act of the server transmitting the first modified IPv4 response to the network address translator so that the network address translator can provide the IPv4 response along with an identification of the IPv4 address and port of the replay so that the IPv4 can communicate directly with the relay for future communications to the IPv6 client.

4. A computer program product comprising one or more computer-readable media having thereon computer-executable instructions for use in a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, the computer-executable instructions for implementing a method for the server helping an IPv4 client within the private network establish communication with an IPv6 client in the IPv6 Internet despite the IPv4 client being configured to communicate using IPv4, but not IPv6, despite the IPv4 client being behind the network address translator, and while reducing the workload of the server, the computer executable instructions for performing the following:

an act of the IPv4 client obtaining an IPv6 address;

an act of the IPv4 client generating an IPv4 message that includes an IPv4 header that includes an IPv4 address and a port of the IPv4 client as a source IPv4 address and a source port, respectively, the IPv4 header further including an IPv4 address and a port of the server as a destination IPv4 address and destination port, respectively, the IPv4 message further including an IPv4 payload that includes the IPv6 address of the IPv4 client and the IPv6 address of the IPv6 client in the IPv6 Internet;

an act of the IPv4 client transmitting the IPv4 message to the server;

an act of the network address translator intercepting the IPv4 message and replacing the source IPv4 address and the source port with the IPv4 address and port, respectively, of the network address translator to thereby generate a first modified IPv4 message;

an act of the network address translator forwarding the first modified IPv4 message to the server;

an act of the server computer system receiving the first modified IPv4 message and generating an IPv6 message that is derived from the first modified IPv4 message, the IPv6 message including the IPv6 address of the IPv4 client that was in the IPv4 payload of the IPv4 message as a source IPv6 address, the IPv6 message further including the IPv6 address of the IPv6 client that was in the IPv4 payload of the IPv4 message as a destination IPv6 address of the IPv6 message;

an act of the server transmitting the IPv6 message to the IPv6 client;

an act of the IPv6 client receiving the IPv6 message and generating an IPv6 response to the IPv6 message using the source IPv6 address included in IPv6 message as the destination IPv6 address, and using the destination IPv6 address included in the IPv6 message as the source IPv6 address;

an act of the IPv6 client dispatching the IPv6 response to the IPv4 client;

an act of the relay intercepting the IPv6 response and determining that the destination IPv6 address included in the IPv6 response corresponds to an IPv4 client;

an act of the relay identifying the IPv4 address and the port of the server based on the destination IPv6 address in the IPv6 response;

an act of the relay constructing an IPv4 response based on the IPv6 response, the IPv4 response including an IPv4 address and a port of the relay as a source IPv4 address and a source port, respectively, an IPv4 address and a port of the server as a destination IPv4 address a destination port, respectively, and having an IPv4 payload that includes the IPv6 address of the IPv6 client and the IPv6 address of the IPv4 client;

an act of the relay transmitting the IPv4 response to the server;

an act of the server receiving the IPv4 response and replacing the source IPv4 address and the source port in the IPv4 response with the IPv4 address and the port, respectively, of the server, and replacing the destination IPv4 address and the destination port in the IPv4 response with the IPv4 address and the port, respectively, of the network address translator, and including in the payload of the IPv4 response an identification of the IPv4 address and port of the relay to generate a first modified IPv4 response; and an act of the server transmitting the first modified IPv4 response to the network address translator;

an act of the network address translator receiving the first modified IPv4 response and replacing the destination IP address and destination port in the first modified IPv4 response with the IPv4 address and the port of the IPv4 client, respectively, to generate a second modified IPv4 response;

an act of the network address translator transmitting the second modified IPv4 response to the client; and an act of the IPv4 client receiving the second modified IPv4 response.

5. In a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, a method for the relay helping an IPv4 client within the private network to establish communication with an IPv6 client in the IPv6 Internet despite the IPv4 client being configured to communicate using IPv4, but not IPv6, despite the IPv4 client being behind the network address translator, and while reducing the workload of the server, the method comprising the following:

an act of the relay intercepting an IPv6 response from an IPv6 client, the IPv6 response being in response to an IPv4 message that originated from an IPv4 client in the private network, wherein the IPv6 designates an IPv6 address of the IPv4 client as a destination IPv6 address, and an IPv6 address of the IPv6 client as a source IPv6 address;

an act of the relay determining that the destination IPv6 address included in the IPv6 response corresponds to an IPv4 client;

an act of the relay identifying the IPv4 address and the port of the server based on the destination IPv6 address in the IPv6 response;

an act of the relay constructing an IPv4 response based on the IPv6 response, the IPv4 response including an IPv4 address and a port of the relay as a source IPv4 address and a source port, respectively, an IPv4 address and a port of the server as a destination IPv4 address a destination port, respectively, and having an IPv4 payload that includes the IPv6 address of the IPv6 client and the IPv6 address of the IPv4 client; and an act of the relay transmitting the IPv4 response to the server.

6. A computer program product comprising one or more computer-readable media having thereon computer-executable instructions for use in a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, the computer-executable instructions for implementing a method for the relay helping an IPv4 client within the private network to establish communication with an IPv6 client in the IPv6 Internet despite the IPv4 client being configured to communicate using IPv4, but not IPv6, despite the IPv4 client being behind the network address translator, and while reducing the workload of the server, the computer executable instructions for performing the following acts:

an act of the relay intercepting an IPv6 response from an IPv6 client, the IPv6 response being in response to an IPv4 message that originated from an IPv4 client in the private network, wherein the IPv6 designates an IPv6 address of the IPv4 client as a destination IPv6 address, and an IPv6 address of the IPv6 client as a source IPv6 address;

an act of the relay determining that the destination IPv6 address included in the IPv6 response corresponds to an IPv4 client;

an act of the relay identifying the IPv4 address and the port of the server based on the destination IPv6 address in the IPv6 response;

an act of the relay constructing an IPv4 response based on the IPv6 response, the IPv4 response including an IPv4 address and a port of the relay as a source IPv4 address and a source port, respectively, an IPv4 address and a port of the server as a destination IPv4 address a destination port, respectively, and having an IPv4 payload that includes the IPv6 address of the IPv6 client and the IPv6 address of the IPv4 client; and an act of the relay transmitting the IPv4 response to the server.

7. In a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, a method for an IPv4 client within the private network establishing communication with an IPv6 client in the IPv6 Internet despite the IPv4 client being configured to communicate using IPv4, but not IPv6, despite the IPv4 client being behind the network address translator, and while reducing the workload of the server, the method comprising the following:

an act of the IPv4 client obtaining an IPv6 address;

an act of the IPv4 client generating an IPv4 message that includes an IPv4 header that includes an IPv4 address and a port of the IPv4 client as a source IPv4 address and a source port, respectively, the IPv4 header further including an IPv4 address and a port of the server as a destination IPv4 address and destination port, respectively, the IPv4 message further including an IPv4 payload that includes the IPv6 address of the IPv4 client and the IPv6 address of the IPv6 client in the IPv6 Internet;

an act of the IPv4 client transmitting the IPv4 message to the server;

an act of the network address translator intercepting the IPv4 message and replacing the source IPv4 address and the source port with the IPv4 address and port, respectively, of the network address translator to thereby generate a first modified IPv4 message;

an act of the network address translator forwarding the first modified IPv4 message to the server;

an act of the server computer system receiving the first modified IPv4 message and generating an IPv6 message that is derived from the first modified IPv4 message, the IPv6 message including the IPv6 address of the IPv4 client that was in the IPv4 payload of the IPv4 message as a source IPv6 address, the IPv6 message further including the IPv6 address of the IPv6 client that was in the IPv4 payload of the IPv4 message as a destination IPv6 address of the IPv6 message;

an act of the server transmitting the IPv6 message to the IPv6 client;

an act of the IPv6 client receiving the IPv6 message and generating an IPv6 response to the IPv6 message using the source IPv6 address included in IPv6 message as the destination IPv6 address, and using the destination IPv6 address included in the IPv6 message as the source IPv6 address;

an act of the IPv6 client dispatching the IPv6 response to the IPv4 client;

an act of the relay intercepting the IPv6 response and determining that the destination IPv6 address included in the IPv6 response corresponds to an IPv4 client;

an act of the relay determining that the network address translator behind which the IPv4 client resides is a cone NAT;

an act of the relay constructing an IPv4 response based on the IPv6 response, the IPv4 response including an IPv4 address and a port of the relay as a source IPv4 address and a source port, respectively, an IPv4 address and a port of the IPv4 client as a destination IPv4 address a destination port, respectively, and having an IPv4 payload that includes the IPv6 address of the IPv6 client and the IPv6 address of the IPv4 client; and an act of the relay transmitting the IPv4 response to the IPv4 client.

8. A method in accordance with claim 7, further comprising:

an act of the IPv4 client communicating the IPv6 client by sending IPv4 messages to the relay using the IPv4 address and port of the relay identified in the second modified IPv4 response.

9. A method in accordance with claim 7, wherein the act of the replay determining that the network address translator behind which the IPv4 client resides is a cone NAT comprise the following:

reading information from the IPv6 address of the IPv4 client that represents that the IPv4 client is behind a cone NAT.

10. In a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, a method for the relay helping an IPv4 client within the private network to establish communication with an IPv6 client in the IPv6 Internet despite the IPv4 client being configured to communicate using IPv4, but not IPv6, despite the IPv4 client being behind the network address translator, and while reducing the workload of the server, the method comprising the following:

an act of the relay intercepting an IPv6 response from an IPv6 client, the IPv6 response being in response to an IPv4 message that originated from an IPv4 client in the private network, wherein the IPv6 designates an IPv6 address of the IPv4 client as a destination IPv6 address, and an IPv6 address of the IPv6 client as a source IPv6 address;

an act of the relay determining that the destination IPv6 address included in the IPv6 response corresponds to an IPv4 client;

an act of the relay determining that the network address translator behind which the IPv4 client resides is a cone NAT;

an act of the relay constructing an IPv4 response based on the IPv6 response, the IPv4 response including an IPv4 address and a port of the relay as a source IPv4 address and a source port, respectively, an IPv4 address and a port of the IPv4 client as a destination IPv4 address a destination port, respectively, and having an IPv4 payload that includes the IPv6 address of the IPv6 client and the IPv6 address of the IPv4 client; and an act of the relay transmitting the IPv4 response to the IPv4 client.

11. A computer program product comprising one or more computer-readable media having thereon computer-executable instructions for use in a network environment that includes an IPv6 Internet in which a plurality of IPv6 clients may communicate using IPv6. an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, the computer-executable instructions for a method for the relay helping an IPv4 client within the private network to establish communication with an IPv6 client in the IPv6 Internet despite the IPv4 client being configured to communicate using IPv4, but not IPv6, despite the IPv4 client being behind the network address translator, and while reducing the workload of the server, the computer executable instructions for performing the following acts:

an act of the relay intercepting an IPv6 response from an IPv6 client, the IPv6 response being in response to an IPv4 message that originated from an IPv4 client in the private network, wherein the IPv6 designates an IPv6 address of the IPv4 client as a destination IPv6 address, and an IPv6 address of the IPv6 client as a source IPv6 address;

an act of the relay determining that the destination IPv6 address included in the IPv6 response corresponds to an IPv4 client;

an act of the relay determining that the network address translator behind which the IPv4 client resides is a cone NAT;

an act of the relay constructing an IPv4 response based on the IPv6 response, the IPv4 response including an IPv4 address and a port of the relay as a source IPv4 address and a source port, respectively, an IPv4 address and a port of the IPv4 client as a destination IPv4 address a destination port, respectively, and having an IPv4 payload that includes the IPv6 address of the IPv6 client and the IPv6 address of the IPv4 client; and an act of the relay transmitting the IPv4 response to the IPv4 client.

12. In a network environment that includes an IPv6 Internet in which a plurality of IPv6 clients may communicate using IPv6, an IPv4 Internet in which a plurality of IPv4 clients may communicate using IPv4 and including a server and a relay that are each capable of communicating over both the IPv4 Internet and the IPv6 Internet, the network environment further including a private network of one or more IPv4 clients that are separated from the other portions of the IPv4 Internet by a network address translator, a method for an IPv6 client in the IPv6 Internet establishing communication with an IPv4 client within the private network despite the IPv4 client being configured to communicate using IPv4, but not IPv6, despite the IPv4 client being behind the network address translator, and while reducing the workload of the server, the method comprising the following:

an act of the IPv6 client dispatching a IPv6 message to the IPv4 client, the IPv6 message including an IPv6 address of the IPv6 client as the source IPv6 address, and including an IPv6 address of the IPv4 client as the destination IPv6 address;

an act of the relay intercepting the IPv6 message and determining that the destination IPv6 address included in the IPv6 message corresponds to an IPv4 client;

an act of the relay identifying an IPv4 address and the port of the server based on the destination IPv6 address in the IPv6 message;

an act of the relay queuing at least an IPv6 payload of the IPv6 message an act of the relay constructing an IPv4 message based on the IPv6 message, the IPv4 message including an IPv4 address and a port of the relay as a source IPv4 address and a source port, respectively, an IPv4 address and a port of the server as a destination IPv4 address a destination port, respectively, and having an IPv4 payload that includes the IPv6 address of the IPv6 client and the IPv6 address of the IPv4 client;

an act of the relay transmitting the IPv4 message to the server while the IPv6 payload remains queued at the relay;

an act of the server receiving the IPv4 message and replacing the source IPv4 address and the source port in the IPv4 message with the IPv4 address and the port, respectively, of the server, and replacing the destination IPv4 address and the destination port in the IPv4 message with the IPv4 address and the port, respectively, of the network address translator, and including in the payload of the IPv4 message an identification of the IPv4 address and port of the relay to generate a first modified IPv4 message;

an act of the server transmitting the first modified IPv4 message to the network address translator;

an act of the network address translator receiving the first modified IPv4 message and replacing the destination IP address and destination port in the first modified IPv4 message with the IPv4 address and the port of the IPv4 client, respectively, to generate a second modified IPv4 message;

an act of the network address translator transmitting the second modified IPv4 message to the IPv4 client;

an act of the IPv4 client receiving the second modified IPv4 message;

an act of the IPv4 client generating an IPv4 response to the second modified IPv4 message, the IPv4 response including the IPv4 address and the port of the IPv4 client as a source address and port, and including the IPv4 address and the port of the relay as a destination address and port;

an act of the IPv4 client dispatching the IPv4 response to the relay;

an act of the network address translator intercepting the IPv4 response and replacing the source IPv4 address and the source port with the IPv4 address and port, respectively, of the network address translator to thereby generate a first modified IPv4 response;

an act of the network address translator forwarding the first modified IPv4 response to the relay;

an act of the relay dequeuing the IPv6 payload in response to having received the first modified IPv4 response;

an act of the relay constructing a second IPv4 message that includes the IPv4 address and the port of the relay as the source IPv4 address and port, and that includes the mapped IPv4 address and port of the IPv4 client as the destination IPv4 address and port, the second IPv4 message further including the IPv6 address of the IPv6 client, the IPv6 address of the IPv4 client, and the IPv6 payload;

an act of the relay dispatching the second IPv4 message to the IPv4 client;

an act of the network address translator receiving the second IPv4 message and replacing the destination IP address and destination port in the second IPv4 message with the IPv4 address and the port of the IPv4 client, respectively, to generate a modified version of the second IPv4 message; and an act of the network address translator transmitting the modified version of the second IPv4 message to the IPv4 client.

* * * * *